United States Patent

[11] 3,624,572

[72] Inventors John C. Mallinson; Charles W. Steele, both of Palo Alto, Calif.

[21] Appl. No. 33,214
[22] Filed Apr. 30, 1970
[45] Patented Nov. 30, 1971
[73] Assignee Ampex Corporation Redwood City, Calif.

[54] MAGNETS FOR GENERATING SPATIALLY VARYING MAGNETIC FIELDS
8 Claims, 12 Drawing Figs.

[52] U.S. Cl. .......... 335/209, 335/281, 335/284
[51] Int. Cl. .......... H01f 1/00
[50] Field of Search .......... 335/209, 281, 284; 310/11; 179/100.2 D

[56] References Cited

UNITED STATES PATENTS

| | | | |
|---|---|---|---|
| 3,183,381 | 5/1965 | Brogan | 310/11 |
| 3,197,678 | 7/1965 | Primas | 335/209 |
| 2,721,273 | 10/1955 | Waite | 335/209 |
| 2,724,075 | 11/1955 | Van Urk | 335/209 |

OTHER REFERENCES

R. E. Brown; IBM Techn. Disclosure Bulletin, Vol. 7, No. 2; July 1964; pp. 145 & 146.

*Primary Examiner*—William H. Beha, Jr.
*Assistant Examiner*—R. Skudy
*Attorney*—Robert G. Clay

ABSTRACT: Magnet device for generating a spatially periodic magnetic field of decreasing magnitude, while employing a direct current DC source, or permanent magnets, as the field generating source of power. The invention contemplates at least one plurality of poles of selected configuration, adapted to receive a magnetic medium in magnetic bridging relation. A second plurality of poles of selected configuration may be disposed in confronting relation to the first plurality, in selected orientation therewith, defining therebetween a gap of selected dimensions and shape for receiving therethrough the magnetic medium. Accordingly, a magnetic medium passing along a preselected path adjacent the single plurality of poles, or through the gap between the confronting plurality of poles, experiences a spatially varying, symmetrical, magnetic field of selectable constant or varying magnitude. Several arrangements and various modifications are contemplated within the invention concepts to effect the desired operating parameters.

INVENTORS
JOHN C. MALLINSON
CHARLES W. STEELE
BY Robert G. Clay
ATTORNEY

INVENTORS
JOHN C. MALLINSON
CHARLES W. STEELE

BY Robert G. Clay

ATTORNEY

INVENTORS
JOHN C. MALLINSON
CHARLES W. STEELE
BY Robert S. Clay
ATTORNEY

MAGNETS FOR GENERATING SPATIALLY VARYING MAGNETIC FIELDS

BACKGROUND OF THE INVENTION

1. Field

The present invention relates to erase and/or contact duplicating transfer heads, and more particularly to a transducer means capable of providing a spatially varying, symmetrical, magnetic field of selectable frequency and magnitudes, without employing an AC driver.

2. Prior Art

Present day magnetic transducers for providing varying magnetic fields generally utilize alternating current sources and a conventional ring-type head to provide a time-varying magnetic field. In the event a magnetic field of diminishing amplitude is desired, as when erasing a magnetic tape or as when transferring a magnetic history in the process of contact duplication of magnetic mediums, the driving alternating current field is itself diminished with respect to time. Accordingly it follows that prior art devices utilize a time-varying driving source to achieve a decaying magnetic field of oscillating polarity. When employed in the erasing and transfer processes of previous mention, the driving sources require low megaHertz excitations which, in turn, leads to considerable power dissipation problems. Thus prior art devices, particularly those capable of producing intense magnetic fields, require large magnets of prohibitive weight, and associated high energy, alternating current, driver circuits. This combination provides magnetic field generation with high heat dissipating requirements, with prohibitively bulky and cumbersome apparatus. Further, the AC driven, prior art devices require extensive modification in order to provide an output of a variable range of frequencies for use with different speeds of magnetic medium, as for example, when erasing or duplicating. That is, the AC devices, in use, are speed dependent. When generating large, very high frequency fields (e.g., megaHertz), the transducer must be made of special, low-loss ferrites, etc., and must be driven by a special high frequency, high energy, alternating frequency power source.

SUMMARY OF THE INVENTION

The present invention provides a multipole magnet or head configuration of a single series of poles, or of confronting pairs of pole series, having a selected construction and arrangement. A gap of selected width, length and path shape commensurate with the source of energy and the desired application, is provided between the facing sets of poles in the opposing-pole type of structure.

Various modifications are contemplated for providing a spatially varying magnetic field of variable magnitude in accordance with the invention. Thus one embodiment provides a plurality of equal width poles opposing the slots of a similar plurality of poles, less one pole. DC excitation is introduced thereto either by permanent magnets or by DC electromagnets, to provide one series of poles with a positive polarity and the other opposing series of poles with a negative polarity. Continuous magnetic flux paths extend through the poles, across the gap therebetween and through an integral support yoke. In another embodiment, successive poles have alternate polarities and each pole is disposed opposite a respective pole of the same polarity. Continuous magnetic flux paths extend through the pole lengths, into the gap region, and back into the next pole. The yoke in this case need not provide a flux path, but serves mainly as a pole support. Thus in the latter embodiment, each pole is individually wound and DC driven, or provided with a permanent magnet of required polarity.

Various modifications for enabling, or enhancing, the generation of the spatially periodic, magnetic field of variable strength are; variation of the width and spacing of the poles, variation of the ampere turns of the poles, the type of material(s) forming the poles, a combination of the above modifications, etc.

Thus a magnetic material passing between or adjacent the single or double series of poles, within the succession of DC fields, sees a varying magnetic field although the magnet is only DC excited. It may be seen that the strength of the generated field may be readily adjusted, particularly in the electromagnetic configuration. Note further that the device operation is independent of the speed of a passing magnetic medium since the frequency experienced by the medium is determined by its speed through the DC fields. Accordingly, there is no need for special circuits of prior art AC drivers for megaHertz frequency applications, or which would be necessary to adapt the device to different tape speeds. Unlike prior art devices, the DC device of the invention requires no adjustment of frequencies when erasing or transferring magnetic fields at progressively higher speeds.

DESCRIPTION OF THE PREFERRED EMBODIMENTS

Figure 1:
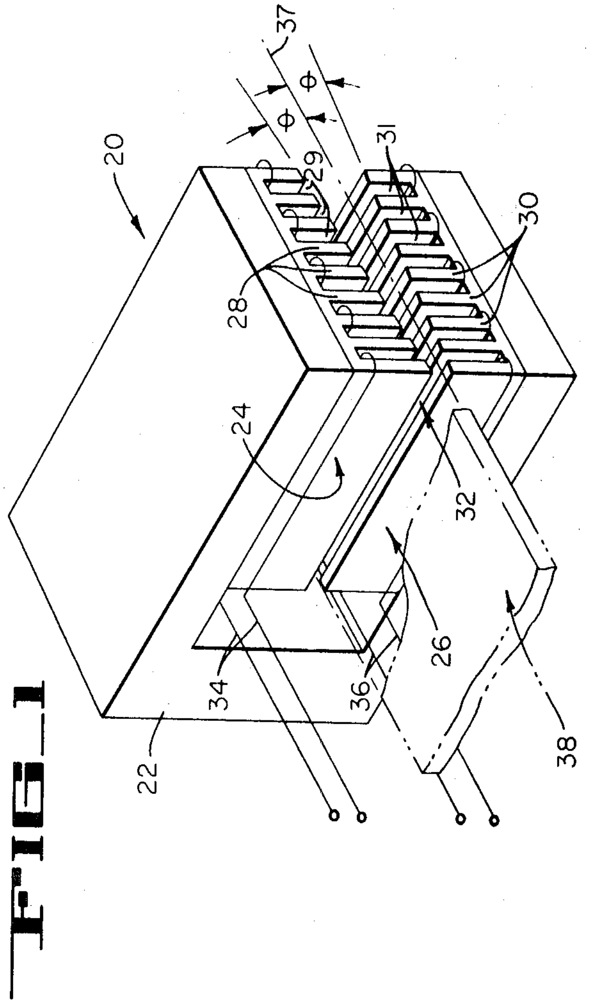
FIG. 1 is a perspective illustrating by way of example a general construction of a magnet of the invention.

Regarding FIG. 1 there is shown an embodiment 20 illustrating the general configuration of the invention magnet means, by way of example only. Thus a core or yoke 22 provides a low-loss path for magnetic flux, and/or a support means, and may be constructed of a single piece of material, a laminated series of material layers, etc. In any event, the yoke 22 is provided with pole pieces 24, 26 integral therewith to define separate pole pieces secured to the ends of the yoke in confronting relation. The yoke 22 may simply provide support for rigidly supporting the confronting pole pieces 24, 26, or may provide a low-loss magnetic flux path, or both. The pole pieces 24, 26 are provided with a plurality of poles 28, 30, respectively, of selected configuration and arrangement. The lengths of the poles are commensurate with the width of the magnetic medium employed, further described infra. The pole pluralities are disposed in confronting relation to define therebetween a gap 32. The gap 32 may have a gradually diverging configuration as shown, or may be constant, depending upon the configuration and arrangement of the poles 28, 30 and the desired application.

By way of example, the poles 28, 30 are herein provided with windings 34, 36 respectively, (similar to the configuration shown below in FIGS. 5 and 6) whereby magnetic fields are generated in the gap 32 by application of direct current (DC) to the windings. Furthermore, the poles 28, 30 are respectively confronting, to define what is herein termed an "opposing pole" type structure. In such structure the yoke 22 need not provide a low-loss magnetic flux path, but rather physical support for the core pieces 24, 26. Also in the configuration of FIG. 1 the gap 32 diverges from a center line 37 as depicted by angles $\theta$. Accordingly, application of a DC current via the windings 34, 36 provides a gradually diminishing magnetic field in the gap 32 starting at the gap entrance and proceeding to its exit. The polarity at each pole 28, 30 is dependent upon the direction of the winding disposed thereabout, and the strength of the field generated by each pole is dependent upon the ampere-turns thereof.

In operation, such as for example when performing the process of contact duplicating of magnetic mediums, a master tape and a slave tape (indicated in phantom line and by a single numeral 38) are disposed in immediate contact and are passed through the gap 32 as depicted in FIG. 1. As the mediums 38 are pulled through the gap 32 they experience a spatially varying magnetic field which provides the bias for facilitating the transfer of the magnetic history from the master tape to the slave tape in a manner generally known in the art and described, for example, in copending application Ser. Nos. 24761 and 128996, filed Apr. 1, 1970 and Mar. 29, 1971 respectively, and assigned to the same assignee as the present application. Similarly, magnetic erasing may be performed by the magnet means 20 in accordance with the invention by the application of a DC current via windings 34, 36 of sufficient magnitude to provide a diminishing, alternating, magnetic field in gap 32 of sufficient strength to overcome the coercive force of the medium (38) and thus erase the magnetic history of the tape. The parameters required for erasing magnetic mediums are well known in the art and thus are not further described herein.

Figure 2:
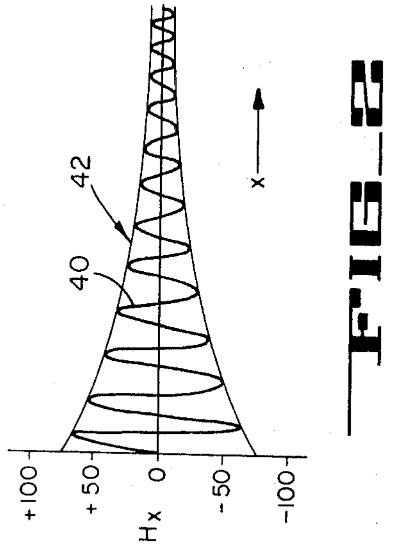
FIG. 2 is a graph depicting the varying magnetic field seen by a magnetic medium passing through the gap of the invention of FIG. 1.

As seen in FIG. 2, the magnet means of FIG. 1 provides a spatially varying magnetic field of diminishing magnitude (as shown by the decaying sine wave 40), capable of providing transfer of magnetic information from one tape to another, or of providing erasure of a magnetic tape, depending upon the strength of the generated field. The graph shows the magnetic field strength $H_x$ versus distance $x$, wherein in accordance with the invention, transfer or erasure is provided via a diminishing field defined by an envelope 42. Optimum operation is provided when the diminishing field has a maximum-to-minimum strength ratio of the order of at least four. In addition, there is an optimum, e.g., minimum, number of cycles through which the field should alternate in order to provide either the functions of transfer or erasure. The number of reversals of the waveform shown in FIG. 2 is dependent upon the number of poles 28, 30 in the series shown, for example, in the device of FIG. 1. By way of example, a generally minimum number of poles is shown (nine) throughout the various embodiments described herein, wherein in actual practice the number of poles might preferably be of the order of 15 to 30.

Figure 4:
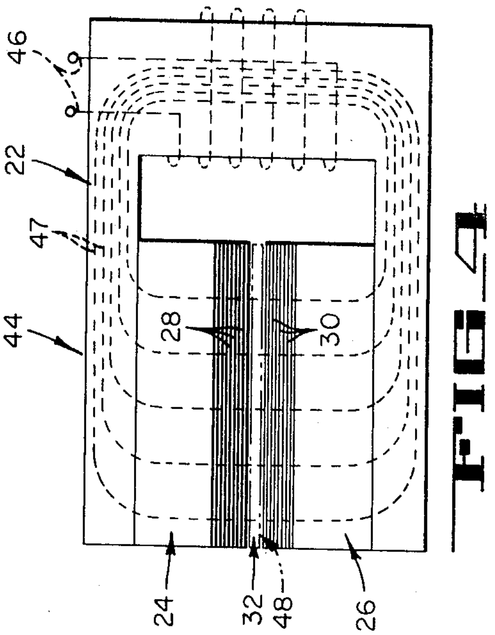
FIGS. 3 and 4 are an end and an elevation respectively of one embodiment of the invention.
Figure 3:
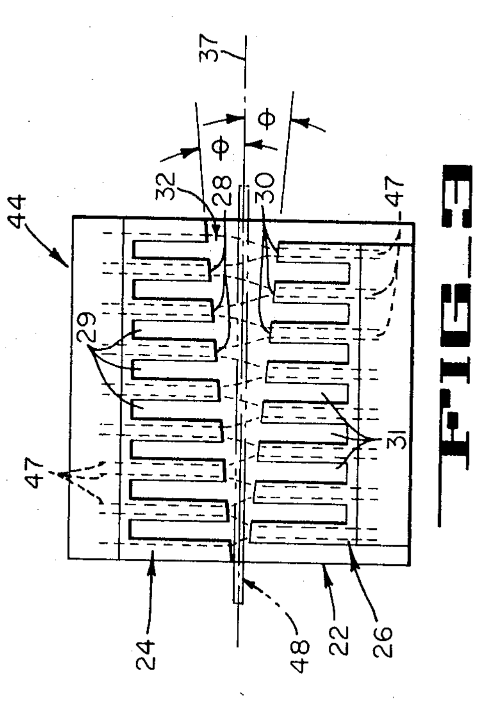

Referring to FIGS. 3 and 4 there is shown one embodiment 44 of the invention, herein termed a "staggered pole" magnet. Since the general configuration of the devices in FIGS. 3, 4 et seq. are generally similar to that of FIG. 1, like numerals indicate similar elements of the magnet. Accordingly, a yoke 22 is integrally secured to the poles pieces 24, 26 to provide a low-loss path for magnetic flux. Pole piece 24 has a plurality of poles 28 formed therein via the cutting of grooves 29 therein. The opposing pole piece 26 has another plurality of poles 30 formed therein, which plurality is one less than that of the pole piece 24. Poles 30 are formed by means of grooves 31 cut into the pole piece 26. The pole piece 26 is arranged such that poles 30 oppose respective grooves 29 in the opposing pole piece 24, thus providing the "staggered pole" configuration. Note that the confronting ends of the poles 28, 30 are ground along a diverging line to define an angle therebetween, thus providing a gap 32 of diverging width. As shown in FIG. 3 the pole ends or tips are ground away to provide the angle $\theta$ with the center line 37 of the gap 32, whereby the total angle between the succession of confronting poles equals 2 $\theta$. The angle $\theta$ shown herein in the various figures is greatly exaggerated for illustration only, and is in practice of the order of from 1° to 2°. Thus 2 $\theta$ is of the order of from 2° to 4°.

In operation, the poles 28 of the pole piece 24 are all thereby the same polarity, and poles 30 are all of the opposite polarity. Accordingly the magnet means 44 may be provided with a permanent magnet or magnets, including a low-loss support yoke 22. For example, permanent magnets may be disposed at either side of the pole pieces 24, 26 whereby all poles 28 are positive and all poles 30 are negative in polarity. On the other hand, as shown in phantom line in FIG. 4, the yoke 22 may be provided with a winding 46 about a select portion thereof by providing the poles 28, 30 with respective polarities upon application of a DC current to the winding 46. The magnetic flux paths of the staggered pole configuration are shown in dashed line and indicated by numeral 47. Accordingly a magnetic medium shown in phantom line and indicated by numeral 48, experiences the horizontal component of the magnetic flux and thus a spatially varying magnetic field when passed through the gap 32 along the center line 37 thereof in accordance with the invention. That is, the horizontal component reverses polarity twice as the medium travels past a pole, and again between poles, etc. As previously noted the spatially varying, diminishing, magnetic field may be utilized for the transfer or erasure processes.

Figure 6:
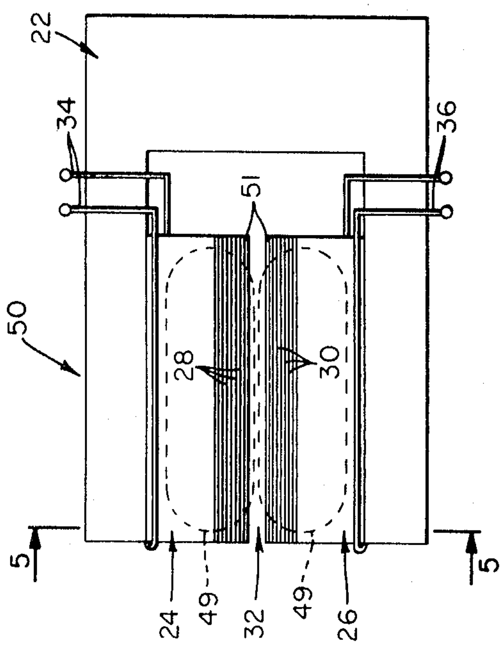
FIGS. 5 and 6 are an end and an elevation respectively of another embodiment of the invention.
Figure 5:
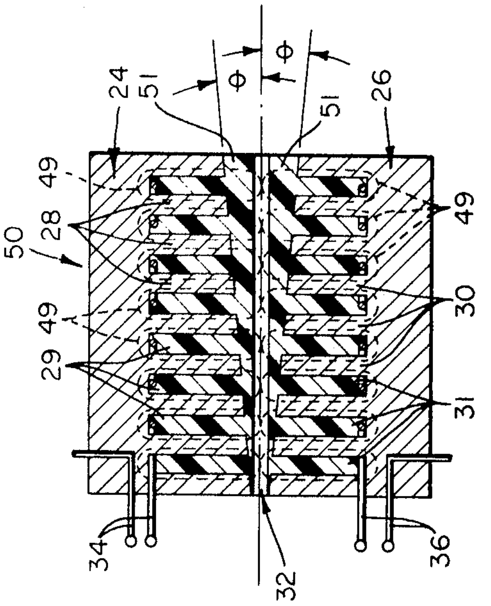

Referring now to FIGS. 5 and 6 there is shown an alternative embodiment 50 of the invention utilizing the same general construction shown in FIGS. 1, 3 and 4, which embodiment 50 is herein termed an alternate polarity, "opposed pole," magnet. Thus the series of poles 28 and 30 are cut into respective pole pieces 24 and 26 by machining grooves 29, 30 respectively therein. Unlike the magnet 44 of FIGS. 3 and 4, the magnet 50 of FIGS. 5 and 6 provides an arrangement whereby the number of poles 28 equals the number of poles 30, with opposing poles and opposing grooves respectively in register. Windings 34, 36 are disposed in the bottom of grooves 29, 31 of the respective pole pieces 24, 26 to thereby provide an alternate polarity for succeeding poles 28, as well as a similar alternating polarity for the poles 30. Poles with the same polarity are opposing in the magnet 50 of FIGS. 5 and 6. The yoke 22 of the opposed pole embodiment 50 is employed as a support structure for precisely holding the confronting pole pieces 24, 26 and need not provide a low-loss path for magnetic flux. This may be seen in the magnetic flux paths of the opposed pole configurations, shown in dashed line and indicated by numeral 51.

As in the magnet 44 of FIGS. 3 and 4, the magnet 50 is provided with a diverging gap 32 by machining the pole tips along an angle $\theta$ with respect to a centerline 27, whereby $2\theta$ defines the total gap angle. Unlike magnet 44, the magnet 50 is further provided with a potting compound indicated at 51, whereby the confronting grooves 29, 31 up to and beyond the ends of the poles 28, 30 are provided with the epoxy compound. The epoxy compound is lapped flat along the confronting surfaces thereof after the epoxy hardens to form the desired gap shape. Thus the compound provides a smooth surface, whereby a medium (not shown) passing through the magnet 50 is stabilized and lubricated relative to the field generated by the magnet by air brought in with the medium.

The epoxy compound is a nonmagnetic material which preferably is electrically insulating. A preferred compound is aluminum-filled epoxy having, for example, 80 percent aluminum dust mixed with 20 percent epoxy. However, other materials such as nonmagnetic stainless steel, aluminum, copper, epoxy, plastic, etc., may be employed. The aluminum/epoxy compound exhibits properties which facilitate fabrication of the magnet, e.g., it is readily cast and hardens rapidly, whereupon it may be machined, ground, drilled, tapped, etc.

Figure 7:
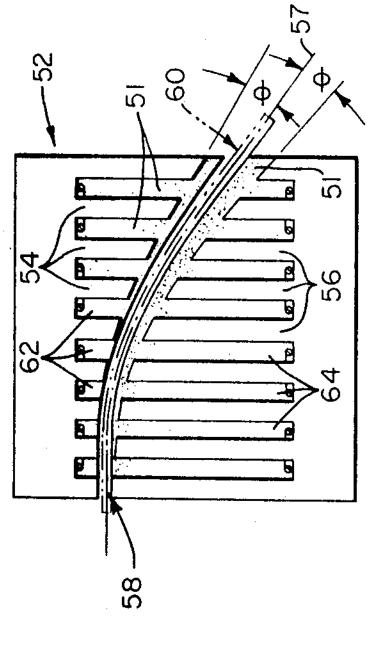

Referring now to FIG. 7 there is shown an alternative embodiment 52 of the magnet of FIGS. 5 and 6, wherein the tips of confronting poles 54, 56 (analogous to poles 28, 30 of FIGS. 5, 6), are machined to describe an arcuate gap 58, which further diverges along the path length thereof. The divergence is indicated by tangents to the respective arcs of the gap, and by the angle $2\theta$. The embodiment 52 of FIG. 7 is particularly advantageous in applications where it is necessary to apply longitudinal tension to a magnetic medium 60 to stabilize the movement through the gap. As in FIGS. 5, 6 the confronting ends of the poles 54, 56, as well as the grooves 62, 64 therebetween, are filled with the potting compound 51 of previous mention, to provide a smooth surface and thus air bearing for supporting the tape when longitudinal tension is applied. The curve of the gap 58 may take the form of for example a circle, a parabola, or other selected geometrical curve shape.

Figure 8:
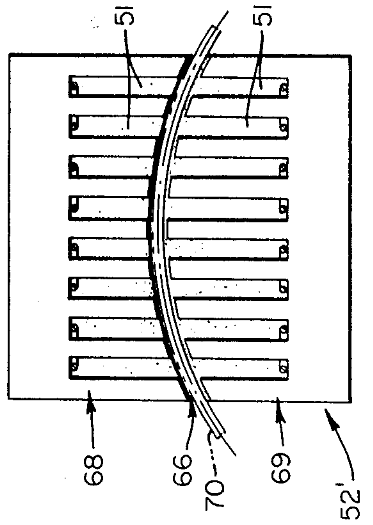
FIGS. 7, 8, 9 and 12 are end views showing various modifications to the embodiments of the previous Figures in accordance with the invention.

A further modification of the magnet 52 is shown in FIG. 8 as 52', wherein the magnet is provided with a circular gap 66 of constant rather than diverging width. The pole pieces 68, 69 of the magnet 52' are symmetrically machined along the pole ends to define the gap 66 as a circular, generally symmetrical arc. Epoxy compound 51 is employed to provide a smooth arcuate surface for supporting a magnetic medium 70 via an air lubricant when applying tension. Unlike the previous embodiments, the distance of the magnetic medium 70 from each pole tip is the same, and thus the magnetic medium 70 sees a magnetic field of constant strength as it passed through the gap 66. A diminishing magnetic field may be provided in the embodiment 52' by the various modifications further described with reference to FIGS. 9–11.

Figure 9:
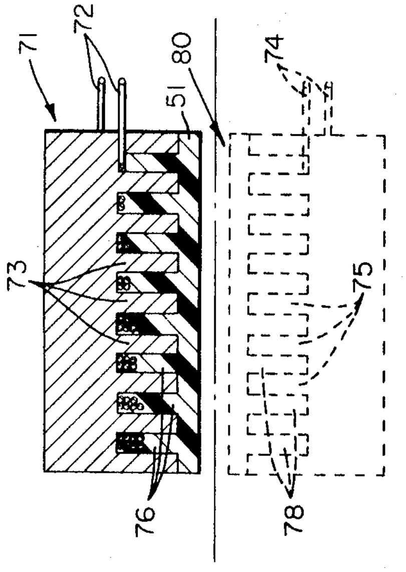

To this end, referring to FIG. 9, a magnet configuration 71 employs a series of poles 73, 75 which are equally distant from a magnetic medium (not shown), e.g., where a gap 80 thereof is not diverging. If a magnetic field of alternating polarity and diminishing strength is desired modifications may be made to selectively vary the field. That is, a gradually diminishing field strength such as shown in FIG. 2 may be obtained by decreasing the number of turns of windings 72, 74 disposed in each succeeding groove 76, 78. This provides a relatively stronger magnetic field at the entrance to the gap 80, and a successively weaker field towards the exit of the gap. Accordingly, the magnet configuration 71 of FIG. 9 employs means for varying the ampere-turns of the succession of poles 73, 75, whereby the magnetic field generated thereby is correspondingly varied, i.e., diminished.

Figure 10:
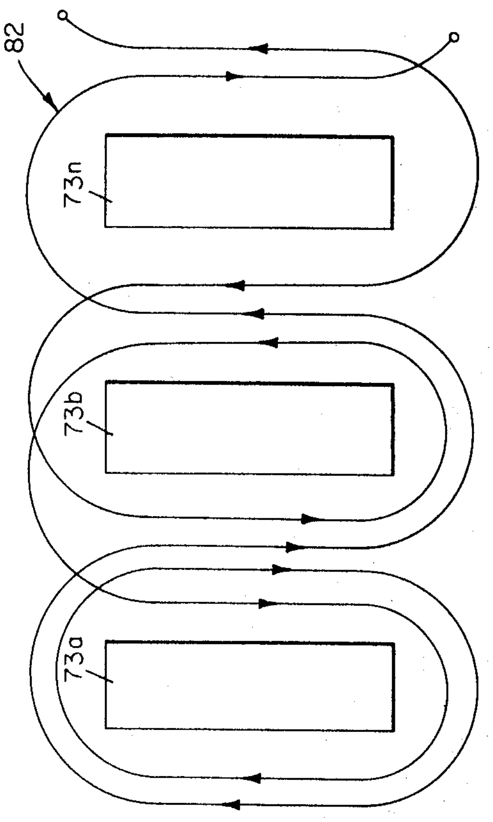
FIGS. 10 and 11 are plan views showing details of windings which may be employed with the various invention configurations.

FIG. 10 is a pictorial representation of a winding configuration which may be employed to provide the varied number of turns shown in magnet 71 of FIG. 9. For ease of explanation only three of the poles (73) are shown. The winding configuration shown by way of example only, is a version of the wave winding configuration commonly employed in fabricating DC machinery. Obviously, other types of winding configurations, e.g., lap, etc., may be employed here. Accordingly, as shown in FIG. 10 a single wire 82 is wound through successive grooves 76 between poles *73a–73n* proceeding from the first to the last, e.g., from the gap exit side to the gap entrance side. Then the wire 82 is wound a lesser number of times around each pole, proceeding from the gap entrance pole *73a* towards the gap exit pole *73n*. As may be seen, a successively lesser number of turns for each pole *73a–73n* results.

Figure 11:
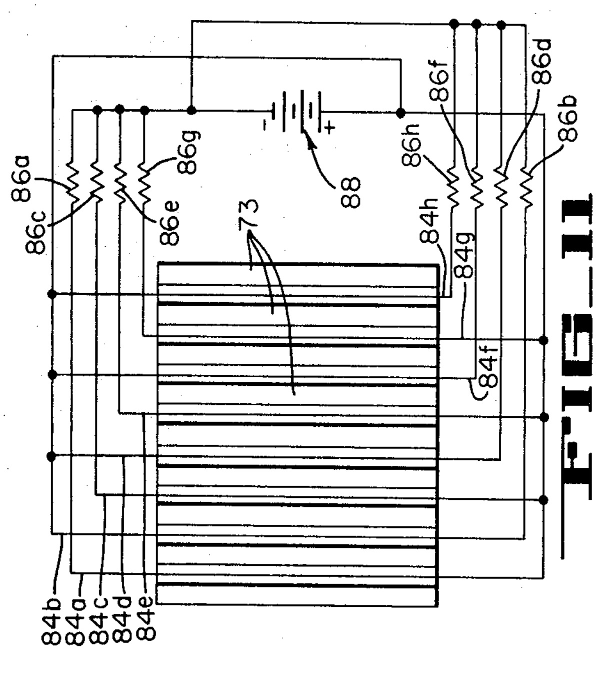

A further modification for varying the ampere-turns is shown in FIG. 11, wherein instead of varying the number of windings disposed in each of the grooves as in FIGS. 9 and 10, the strength of the generated magnetic field is correspondingly varied by controlling the current introduced to similar windings *84a–84h* on respective poles 73 similar to the poles of FIGS. 9, 10. In this example, the windings have the same number of turns. The ampere-turns in FIG. 11 thus are varied by providing resistors *86a*, *86b*, *86c...86h* in successive windings *84a*, *84b*, *84c...84h* respectively, whereby the current passing therethrough is likewise varied to produce a corresponding field strength from respective poles. In this example, the current introduced from a DC source 88 to the winding *84a* nearest the entrance to the gap 80 is largest (i.e., resistor *86a* is smallest) and is progressively diminished across the width of the magnet via increased values of the resistors *86b–86*. The minimum current is supplied to the pole nearest the exit of the magnet via the resistor *86h* of largest value. Note the gap 80 has a constant width as do the gaps of the magnets of FIGS. 8–10. Epoxy compound may or may not be used as desired, or as required by the particular application to which the magnet is put.

Figure 12:
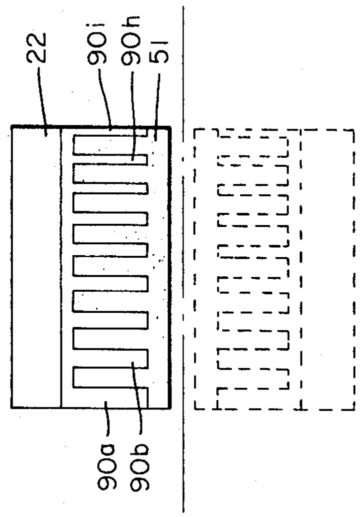

FIG. 12 shows a further modification whereby a diminishing magnetic field is provided by varying the dimensions of the poles rather than the ampere-turns of the energizing means. Accordingly, applying magnetic flux to the yoke 22 by the DC energizing means, (not shown) provides a greater field flux emanating from the thicker poles (e.g., poles *90a*, *90b*,...etc.) and a lesser field flux from the thinner poles (e.g., poles...*90g*, *90h*). The configuration of FIG. 11 is readily adaptable to either the staggered pole magnet 44 of FIGS. 3 and 4, or the opposing pole magnet 50 of FIGS. 5 and 6, etc. It follows either a permanent magnet or windings with a DC source may provide the energizing means of previous mention.

As previously mentioned, there are many modifications which may be made to all of the various embodiments within the spirit of the invention. For example, the yoke 22 may be made of low-loss magnetic material when providing a continuous flux path for the generated magnetic field, or may any type of steel, iron, etc., when employed as a support means for the pole pieces. In fact, the yoke may be dispensed with entirely if other suitable support means are employed. In addition, in all the embodiments, only one set, or series, of the plurality of poles need be employed to provide the spatially varying magnetic field of selected magnitude, in accordance with the invention. Likewise, the dimensions and number of poles may be selectively varied, and the angle $\theta$ may be varied or made zero commensurate with the dimensions. Also, the potting compound may, or may not, be employed with any of the embodiments as variously depicted hereinabove. Still another modification contemplates the use of different or same materials of varying magnetic property, whereby successively diminishing magnetic fields are generated by the successive poles. The number of poles may vary as previously noted, wherein preferred magnetic fields are provided by employing an odd number thereof, particularly in the opposed pole configuration. Note the poles need not be formed of a single pole piece, but may be individually formed.

In all embodiments, when performing the processes of erasing, or of biasing the transfer of a magnetic history, it is desirable that the magnetic medium experiences a substantially symmetrical magnetic field as is generally known in the art.

By way of example only, in the design and fabrication of a magnet means of the invention, first the number of poles is selected commensurate with the number of field reversals desired for the magnetic field generated. Then the pole width, spacing, etc., is selected depending upon the size of head desired, the degree of machining skills available, etc. Next the initial (entrance) gap width is selected commensurate with the thickness of the magnetic medium dimensions, the degree of precision of the machine, etc. The above parameters may then be utilized in computing the angle $\theta$ to be employed, or the number of ampere-turns to be used with a constant gap depth. In use, a tape transport, or the like (not shown), provides the means for maintaining the magnetic medium in the proper position relative to the poles, i.e., to the magnetic field generated by the magnet means commensurate with the particular application.

What is claimed is:

1. Magnet means for generating a spatially periodic magnetic field of selectable magnitude comprising the combination of;

a plurality of poles of selected shape disposed in spaced continuous succession to define a predetermined configuration for generating the spatially periodic magnetic field along a selected path;

means coupled to the plurality of poles for generating in each pole a constant magnetic flux of selected magnitude, wherein the succession of poles form successive magnetic fields of constant magnitudes to define an alternating polarity and thus the spatially periodic magnetic field along the selected path, wherein the electromagnet means further includes means associated with said coils for providing successively decreased ampere-turns coupled to each of the plurality of poles to provide a diminishing field magnitude therefrom along the selected path.

2. The magnet means of claim 1 wherein the means for providing successively decreased ampere-turns includes successively decreasing number of coil turns about successive poles.

3. The magnet means of claim 1 wherein the means for providing successively decreased ampere-turns includes resistor means inserted within respective ones of the plurality of coils, said resistor means having successively greater resistance values to vary correspondingly the current flow therethrough.

4. Magnet means for generating a spatially periodic magnetic field of selectable magnitude comprising the combination of;

a plurality of selected shape disposed in spaced continuous succession to define a predetermined configuration for generating the spatially periodic magnetic field along a selected path, wherein the plurality of poles include field generating pole tips which are machined to provide the selected path in the form of a curve of predetermined curvature; and means coupled to the plurality of poles for generating in each pole a constant magnetic flux of selected magnitude, wherein the succession of poles form successive magnetic fields of constant magnitude to define an alternating polarity and thus the spatially periodic magnetic field along the selected path.

5. The magnet means of claim 4 wherein the field generating pole tips are successively spaced further from a centerline along the selected path of predetermined curvature.

6. The magnet means of claim 4 wherein the field generating pole tips are spaced a constant distance from a centerline along the selected path of predetermined curvature.

7. Magnet means for generating a spatially periodic magnetic field of selectable magnitude comprising the combination of;

a plurality of poles selected shape disposed in spaced continuous succession to define a predetermined configuration for generating the spatially periodic magnetic field along a selected path, wherein the plurality of poles have a successively smaller cross section with selected spacing therebetween to provide a like plurality of magnetic fields of diminishing magnitude along the selected path; and means coupled to the plurality of poles for generating in each pole a constant magnetic flux of selected magnitude, wherein the succession of poles form successive magnetic fields of constant magnitudes to define an alternating polarity and thus the spatially periodic magnetic field along the selected path.

8. Magnet means for generating a spacially periodic magnetic field of selectable magnitude comprising the combination of;

a plurality of poles of selected shape disposed in spaced continuous succession to define a predetermined configuration for generating the spacially periodic magnetic field along a selected path; means associated with the plurality of poles for generating in each pole a constant magnetic flux of selected magnitude, wherein the succession of poles form successive magnetic field of constant magnitudes to define an alternating polarity and thus the spacially periodic magnetic field along the selected path;

the generating means further comprising permanent magnets defining the plurality of poles to provide magnetic flux therewith for generating the constant magnetic field of selected polarity from each pole;

wherein the plurality of successive poles are increasingly removed from a given centerline extending along said selected path, whereby the succession of constant fields generated by the poles selectively diminishes along the selected path.

* * * * *